US012507814B2

(12) United States Patent
Gulick, Jr. et al.

(10) Patent No.: US 12,507,814 B2
(45) Date of Patent: Dec. 30, 2025

(54) SHELF LOCKING DEVICE

(71) Applicant: Scorpion Security Products, Inc., Vestal, NY (US)

(72) Inventors: Franklyn W. Gulick, Jr., Vestal, NY (US); Gary R. Page, Chenango Forks, NY (US)

(73) Assignee: Scorpion Security Products, Inc., Vestal, NY (US)

( * ) Notice: Subject to any disclaimer, the term of this patent is extended or adjusted under 35 U.S.C. 154(b) by 136 days.

(21) Appl. No.: 18/597,649

(22) Filed: Mar. 6, 2024

(65) Prior Publication Data

US 2024/0298818 A1 Sep. 12, 2024

Related U.S. Application Data

(60) Provisional application No. 63/450,295, filed on Mar. 6, 2023.

(51) Int. Cl.
*A47F 5/00* (2006.01)
*E05B 73/00* (2006.01)
*A47B 57/06* (2006.01)

(52) U.S. Cl.
CPC ............ *A47F 5/0043* (2013.01); *E05B 73/00* (2013.01); *A47B 57/06* (2013.01)

(58) Field of Classification Search
CPC .... A47F 5/0043; E05B 73/00; E05B 73/0017; A47B 57/06
See application file for complete search history.

(56) References Cited

U.S. PATENT DOCUMENTS

| | | | | |
|---|---|---|---|---|
| 1,974,050 | A * | 9/1934 | Keil | A47B 57/42 248/243 |
| 4,607,754 | A * | 8/1986 | Wolf | A47B 57/408 211/183 |
| 5,022,621 | A * | 6/1991 | Quest | A47B 57/42 248/222.13 |
| 5,116,007 | A * | 5/1992 | Von Gunton | A47B 57/42 108/108 |
| 5,185,971 | A * | 2/1993 | Johnson, Jr. | A47F 5/0846 52/36.6 |
| 11,141,005 | B2 * | 10/2021 | Steger | A47F 5/101 |
| 12,329,280 | B2 * | 6/2025 | Li | A47B 96/028 |
| 2014/0374555 | A1 * | 12/2014 | Sukman | A47B 96/028 248/222.14 |

* cited by examiner

*Primary Examiner* — Eret C Mcnichols
(74) *Attorney, Agent, or Firm* — Barclay Damon LLP

(57) ABSTRACT

A shelf locking device includes a body with forward and rearward facing surfaces. The rearward facing surface includes a first protrusion and a second protrusion. A lock member is pivotally coupled to the rearward facing surface of the body and includes a first portion and a second portion. The first portion and the second portion each include a first protrusion engagement surface and a second protrusion engagement surface. In an unlocked position, the first protrusion engagement surface of the first portion engages the first protrusion of the body and the second protrusion engagement surface of the second portion engages the second protrusion of the body. In a locked position, the second protrusion engagement surface of the first portion engages the second protrusion of the body and the first protrusion engagement surface of the second portion engages the first protrusion of the body.

19 Claims, 12 Drawing Sheets

SHELF LOCKING DEVICE

CROSS-REFERENCE TO RELATED APPLICATION

This application claims the benefit and the priority of U.S. Provisional Patent Application No. 63/450,295, entitled Shelf Locking Device, filed on Mar. 6, 2023, under relevant portions of 35 U.S.C. §§ 119 and 120. The entire contents of said application are hereby incorporated by reference.

TECHNICAL FIELD

The foregoing disclosure relates to a locking device to be used with adjustable shelving units, such as gondola upright shelving units, to inhibit removal and adjustment of a shelving unit when in place. The foregoing disclosure also relates to a secure display system comprising multiple locking devices used in conjunction with one or more powered security apparatuses, such as a barrier system. The multiple locking devices inhibit removal/adjustment of shelves of the shelving unit as well as inhibit wires of the powered apparatuses from being unplugged or cut.

BACKGROUND OF THE INVENTION

Shoplifting is a cost of doing business for retailers and securing inventory while displaying it for consumers is a real challenge. One common method of displaying inventory for customers is by using upright adjustable shelving fixtures, such as gondola shelving units. The adjustability of these shelving fixtures enables employees to remove the shelves from the fixture frame itself in order to adjust the height dimension between shelves. However, thieves can also remove the shelves from the fixture frame in an attempt to steal products. A dislodging of the shelf may also occur accidently causing the shelf and the products held on the shelf to fall on the customer or employee. There exists a need for a device to lock the shelves of an adjustable shelving fixture in place, while also providing for easy removal when an adjustment is required.

SUMMARY

Therefore and according to one aspect, there is provided a shelf locking device that includes a body extending from a first body end to an opposing second body end. The body includes a forward facing surface, and a rearward facing surface that includes a first protrusion extending from the rearward facing surface and a second protrusion extending from the rearward facing surface. The shelf locking device further includes a lock member that is pivotally coupled to the rearward facing surface of the body. The lock member includes a first portion extending along a first axis and a second portion extending along a second axis that is parallel to the first axis and laterally offset by a distance. The first portion further includes a first protrusion engagement surface and a second protrusion engagement surface, and the second portion includes a first protrusion engagement surface and a second protrusion engagement surface. The shelf locking device can be moved between an unlocked position and a locked position. When the shelf locking device is in an unlocked position, the first protrusion engagement surface of the first portion of the lock member engages the first protrusion of the body and the second protrusion engagement surface of the second portion of the lock member engages the second protrusion of the body. When the shelf locking device is in a locked position, the second protrusion engagement surface of the first portion of the lock member engages the second protrusion of the body and the first protrusion engagement surface of the second portion of the lock member engages the first protrusion of the body.

In an embodiment, the first protrusion engagement surface of the first portion faces in a first direction and the second protrusion engagement surface of the second portion faces in a second direction that faces away from the first direction. In an embodiment, the shelf locking device further includes a pivot member that traverses the body and the lock member. In an embodiment, the body of the shelf locking device further includes at least one body lip that extends from the forward facing surface of the body. In an embodiment, the shelf locking device further includes a securing member configured to couple to an end of the pivot member. In another embodiment of the shelf locking device, the first protrusion engagement surface of the first portion and the first protrusion engagement surface of the second portion face in a first direction, and the second protrusion engagement surface of the first portion and the second protrusion engagement surface of the second portion face in a second direction. In an embodiment, the first direction is opposite the second direction.

According to another aspect, there is provided a shelf locking device that includes a body having a forward facing surface, and a rearward facing surface that includes a first protrusion extending from the rearward facing surface, and a second protrusion extending from the rearward facing surface. The shelf locking device further includes a lock member that is pivotally coupled to the rearward facing surface of the body. The lock member includes a first portion, and a second portion that extends away from the first portion. The first portion further includes a first protrusion engagement surface and a second protrusion engagement surface. The second portion includes a first protrusion engagement surface and a second protrusion engagement surface. The shelf locking device can be moved between an unlocked position and a locked position. When the shelf locking device is in an unlocked position, the first protrusion engagement surface of the first portion of the lock member engages the first protrusion of the body and the second protrusion engagement surface of the second portion of the lock member engages the second protrusion of the body. When the shelf locking device is in a locked position, the second protrusion engagement surface of the first portion of the lock member engages the second protrusion of the body and the first protrusion engagement surface of the second portion of the lock member engages the first protrusion of the body.

According to another aspect, a method of manufacturing a shelf locking device is described. The method includes:

- structuring a body to comprise a forward facing surface, and a rearward facing surface;
- structuring the rearward facing surface to include a first protrusion and a second protrusion that each extend from the rearward facing surface;
- structuring a lock member to pivotally coupled to the rearward facing surface of the body and to comprise a first portion, and a second portion that extends away from the first portion;
- structuring the first portion to include a first protrusion engagement surface and a second protrusion engagement surface;
- structuring the second portion to include a first protrusion engagement surface and a second protrusion engagement surface;

structuring the shelf locking device to define an unlocked position where the first protrusion engagement surface of the first portion of the lock member engages the first protrusion of the body and the second protrusion engagement surface of the second portion of the lock member engages the second protrusion of the body; and structuring the shelf locking device to define a locked position where the second protrusion engagement surface of the first portion of the lock member engages the second protrusion of the body and the first protrusion engagement surface of the second portion of the lock member engages the first protrusion of the body.

DESCRIPTION OF THE DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following Detailed Description, which should be read in connection with the accompanying drawings.

The purpose of the drawings is to depict salient features of the present invention and associated method of manufacture and are not specifically provided to scale. Therefore, the drawings should not be relied upon for scalar purposes. In addition and for reasons of clarity, the same element numbers may be used throughout the accompanying drawings to indicate same elements from one drawing to the next.

DETAILED DESCRIPTION OF THE INVENTION

Throughout this disclosure set forth herein, the word "including" indicates or means "including, without limitation," the word "includes" indicates or means "includes, without limitation," the phrases "such as" and "e.g." indicate or mean "including, without limitation," and the phrase "for example" refers to a non-limiting example. It will be understood that the herein described versions are examples that embody certain inventive concepts, as detailed herein. To that end, other variations and modifications will be readily apparent to those of sufficient skill. In addition, certain terms are used throughout this discussion in order to provide a suitable frame of reference with regard to the accompanying drawings. These terms such as "upper", "lower", "forward", "rearward", "interior", "exterior", "front", "back", "top", "bottom", "inner", "outer", "first", "second", and the like are not intended to limit these concepts, except where so specifically indicated. For purposes of the following discussion, the terms "about", "generally", or "approximately" as used herein may refer to a range of 80%-125% of the claimed or disclosed value.

Adjustable shelfing fixtures are commonly used in retail setting to display merchandise. While there are many types of such shelving, the invention will be described with reference to gondola style shelving units, however one would realize that the shelf locking device could be used with other types of adjustable shelving systems.

Figure 11:
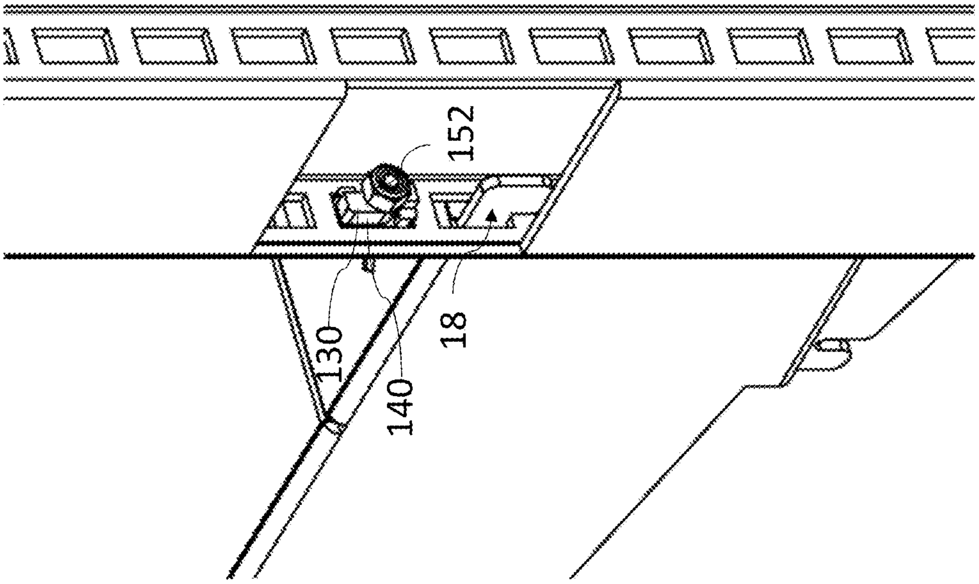
FIG. 11 illustrates a rear perspective view of the embodiment of FIG. 10 with a portion of the shelving unit removed in order to see the rear side of the shelf locking device, which is shown in an unlocked state.
Figure 12:
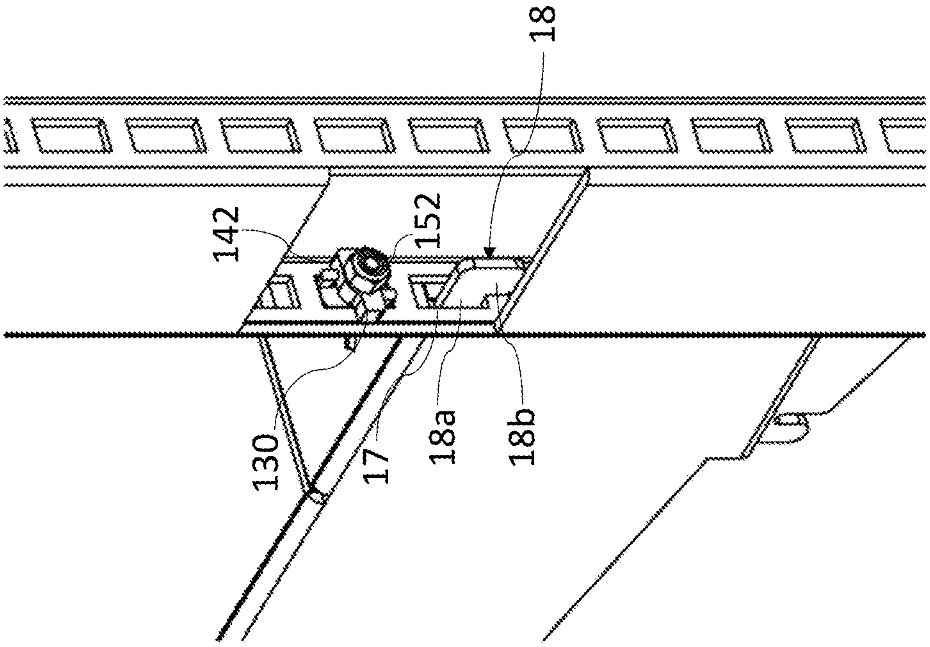
FIG. 12 illustrates the embodiment of FIG. 11 with the shelf locking device shown in a locked state.

An exemplary embodiment of the adjustable shelving unit 10 is shown in FIGS. 7-12. As shown, the adjustable shelving unit 10 generally includes one or more upright supports 12, 14 that each define a plurality of adjustment openings 15. One or more horizontal ledges or shelves 16 are structured to interact with the adjustment openings 15 to be removeably coupled to the one or more upright supports 12, 14. For example, the one or more shelves 16 include one or more support engaging elements 18 that are structured to be at least partially accepted by the adjustment openings 15. As shown in FIGS. 11 and 12, the support engaging elements are generally "L" shaped with a first portion **18*a* extending from the shelf 16 and a second portion 18*b* extending at an angle from the first portion and in a downward direction when the shelf 16 is positioned horizontally. When the shelf 16 is installed onto the one or more upright supports 12, 14, the second In order to remove a shelf 16 from the one or more upright supports 12, 14, the shelf 16 is tilted upward and pulled away from the upright supports 12, 14. Installation the shelf 16 is done by bringing it into engagement with the adjustment opening 15 while tilted upward and then lowering to horizontal position. The support engaging elements 18 are at least partially inserted into or through the adjustment openings 15. The first portion 18*a* of the support engaging elements 18 acts to support the shelf 16 and the second portion 18*b* inhibits the support engaging elements 18 from being pulled from the adjustment opening without first lifting the shelf 16 upward and then tilting the shelf 16** in a downward direction.

Figure 1:
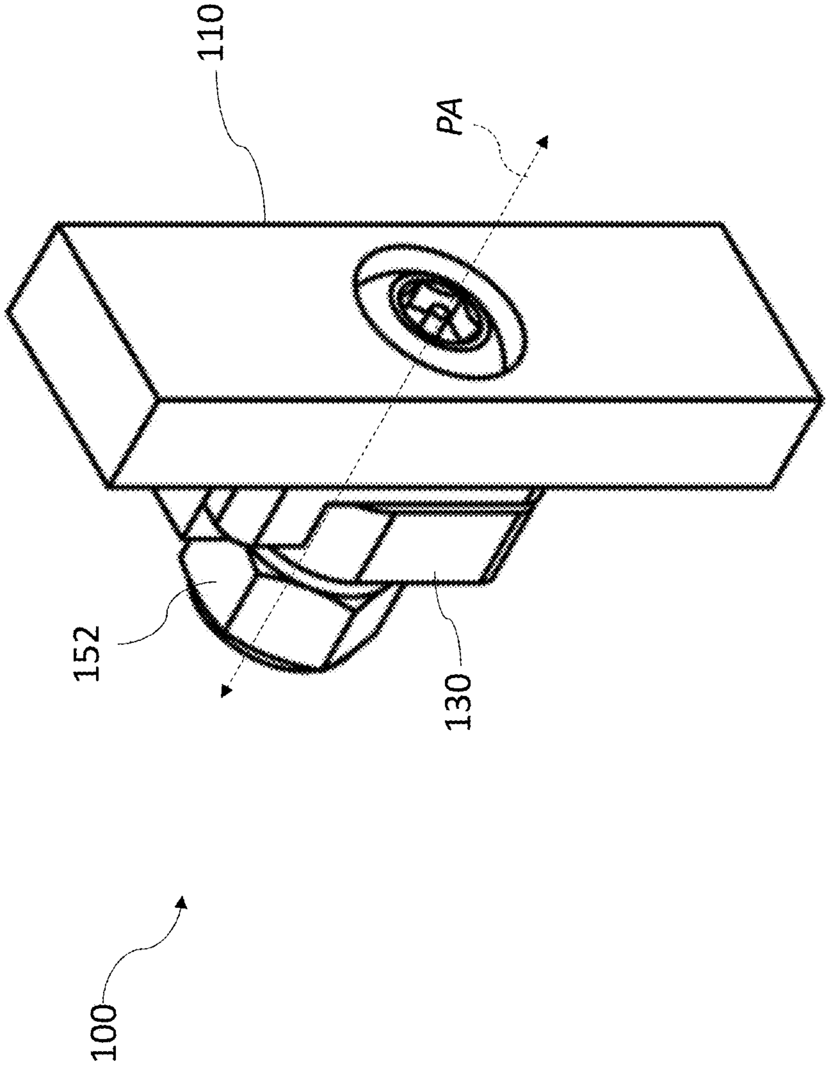
FIG. 1 illustrates a perspective front view of an embodiment of a shelf locking device in an open position.
Figure 2:
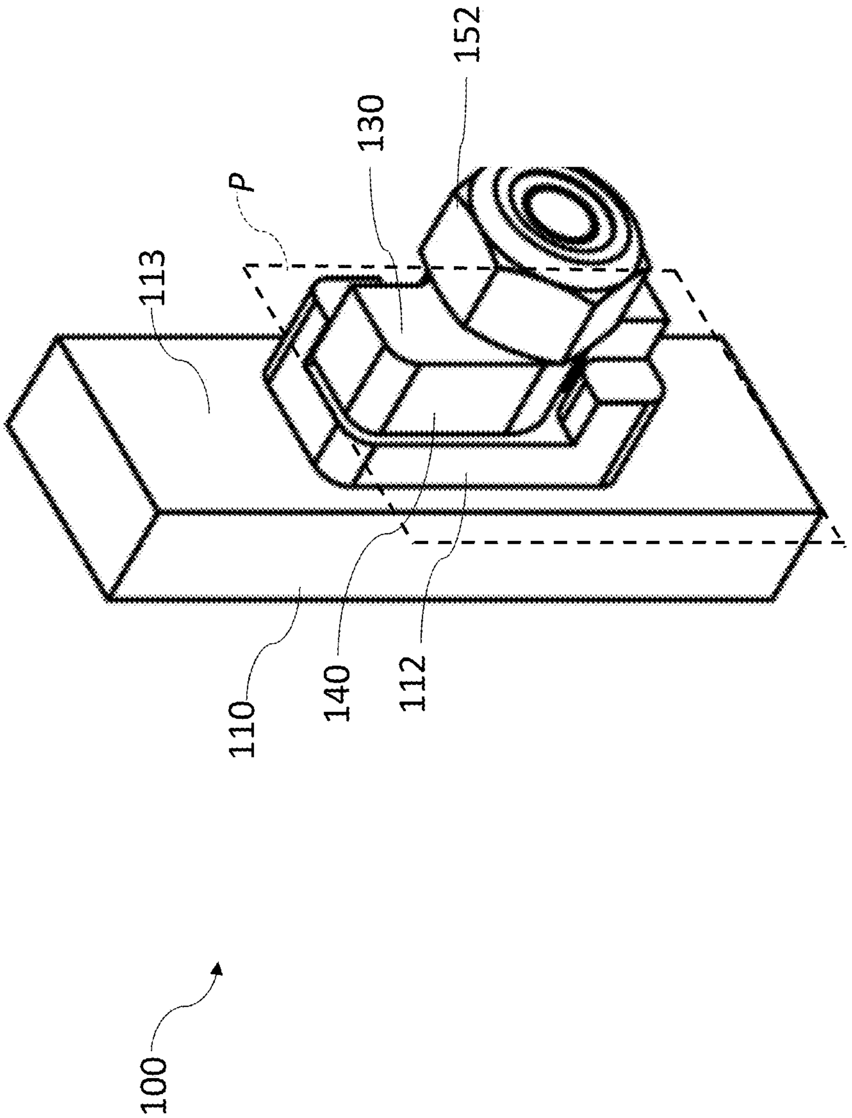
FIG. 2 illustrates a perspective rear view of the embodiment of FIG. 1.
Figure 3:
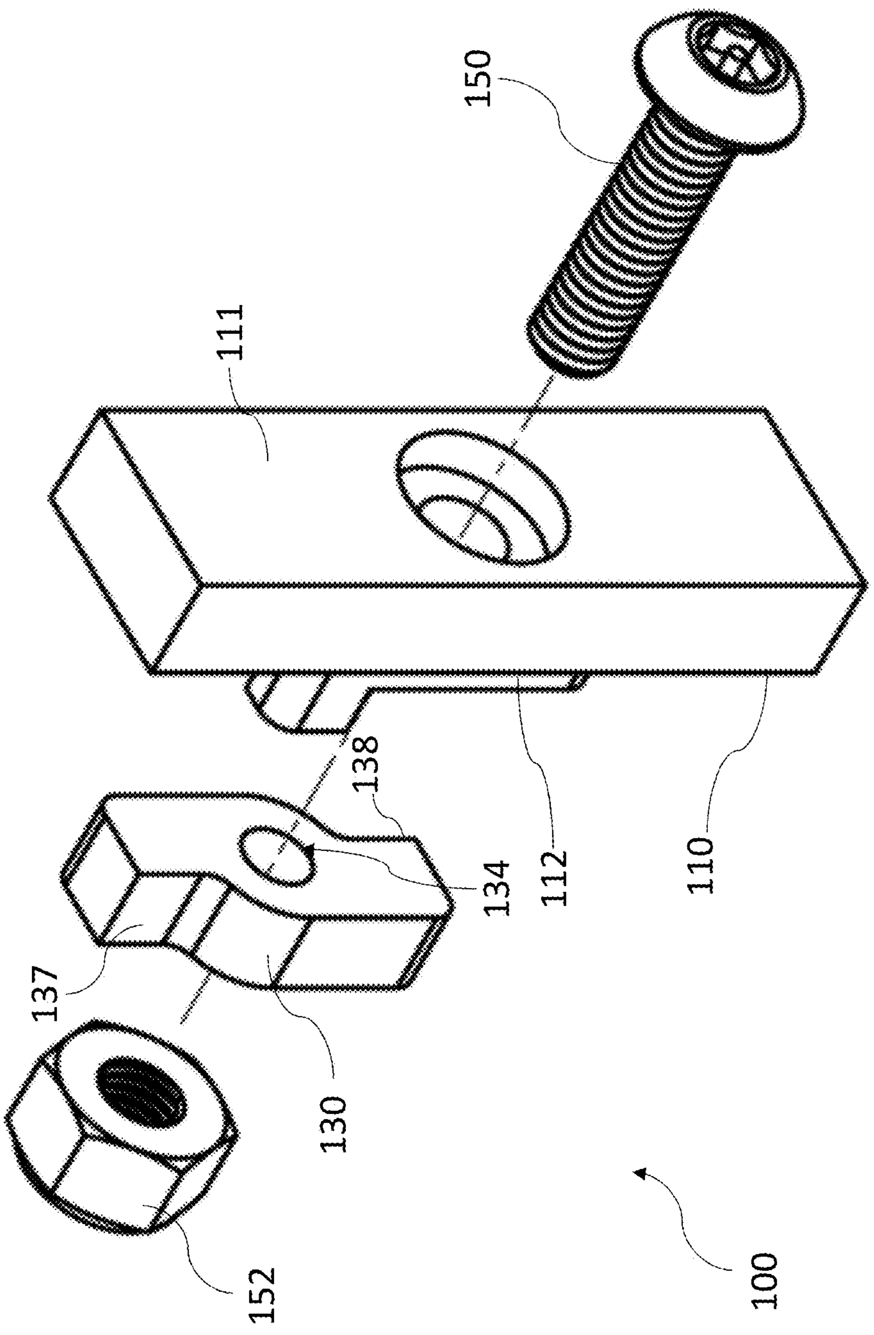
FIG. 3 illustrates an exploded view of the embodiment of FIG. 1.

The locking device 100 is structured to be installed directly above the shelf 16 to inhibit the shelf 16 from being lifted upward, which inhibits removal of the shelf 16 from the upright supports 12, 14. Referring to FIGS. 1-4, the locking device 100 includes a body 110 with a first surface 111 or forward facing surface and a second surface 113 or rearward facing surface. The first surface 111 of the body 110 includes a cradle 112 and an opening 114 is defined that traverses the body 110 and the cradle 112 along an axis PA. As shown specifically in FIG. 4, the cradle 112 includes first and second protrusions 116, 118 or stop members that extend from the cradle 112. The first and second protrusions 116, 118 extend from the plane P of the cradle 112 as indicated in FIG. 2. The body 110 and the cradle 112 may be formed as a single unitary component or may be formed as separate components, which are then coupled together using one or more fasteners and/or a welded joints.

Figure 4:
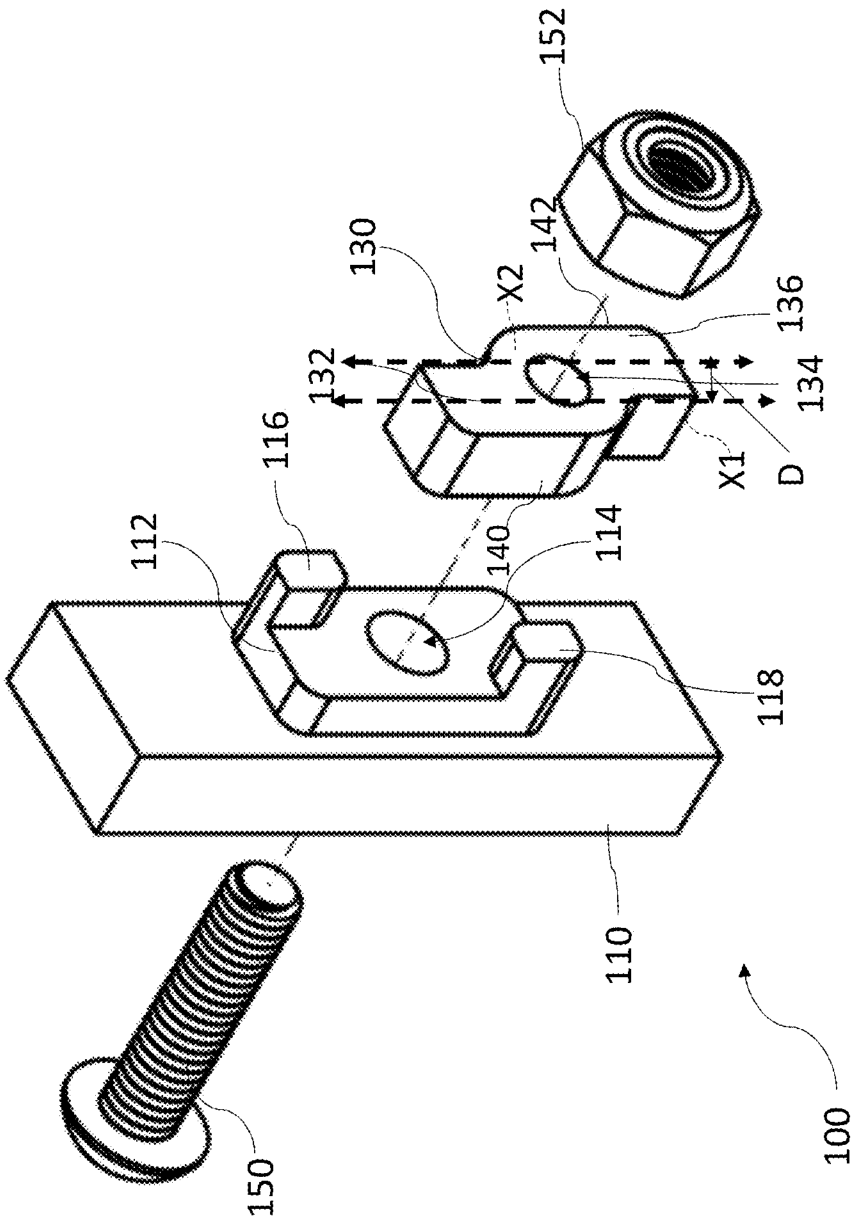
FIG. 4 illustrates an exploded view of the embodiment of FIG. 2.

The locking device 100 further includes a lock member 130 defining a lock member opening 134 that traverses the lock member 130. The lock member 130 has a first portion 132 extending along a first axis X1 and a second portion 136 extending along a second axis X2 that is parallel to the first axis X1 and laterally offset by a distance D from the first axis X1 as shown in FIG. 4. The first portion 132 of the lock member 130 includes a first protrusion engagement surface 137 and the second portion 136 includes a second protrusion engagement surface 138 that faces away from the first protrusion engagement surface 137. Referring to the embodiment shown in FIG. 3, the first protrusion engagement surfaces faces in an opposing direction relative to the second protrusion engagement surface 138.

Figure 5:
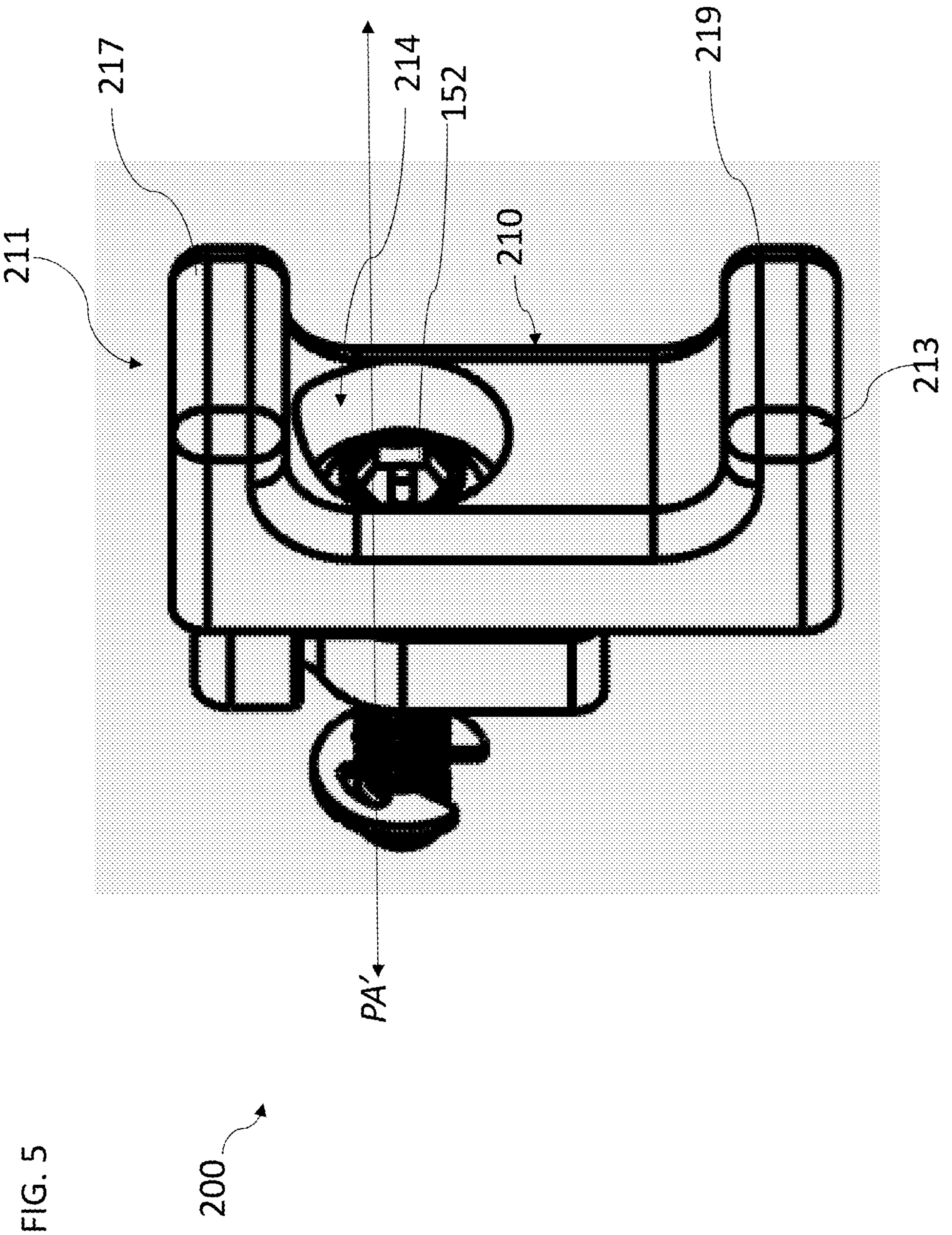
FIG. 5 illustrates a perspective front view of another embodiment of the shelf locking device.
Figure 6:
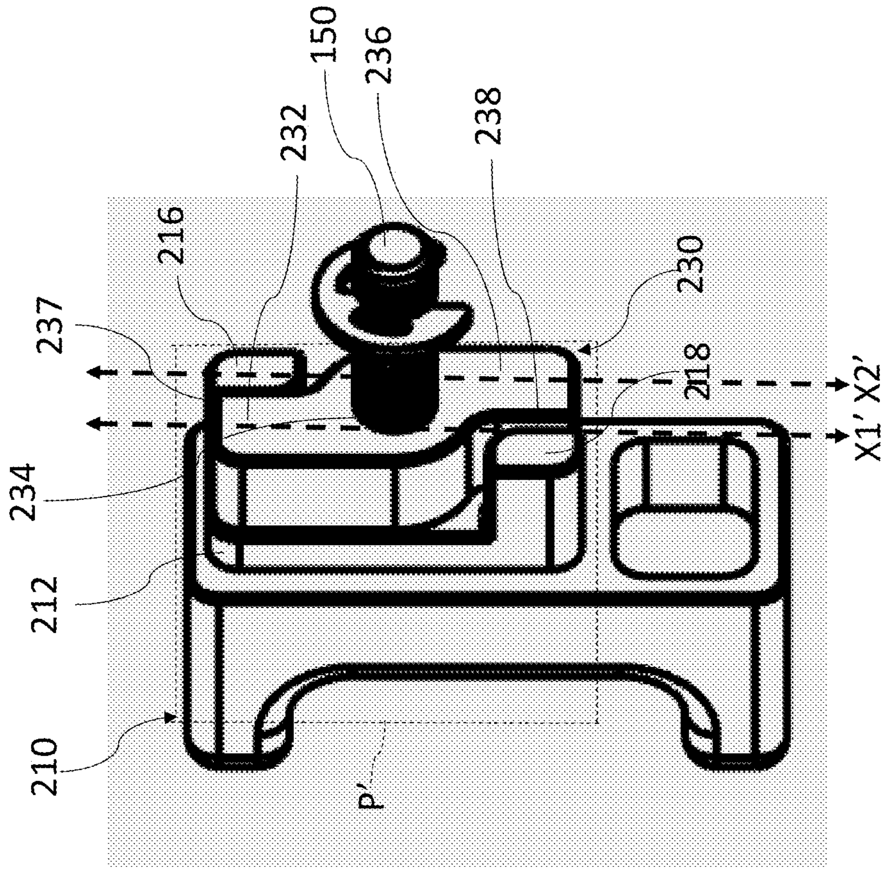
FIG. 6 illustrates a perspective rear view of the embodiment of FIG. 5.
Figure 7:
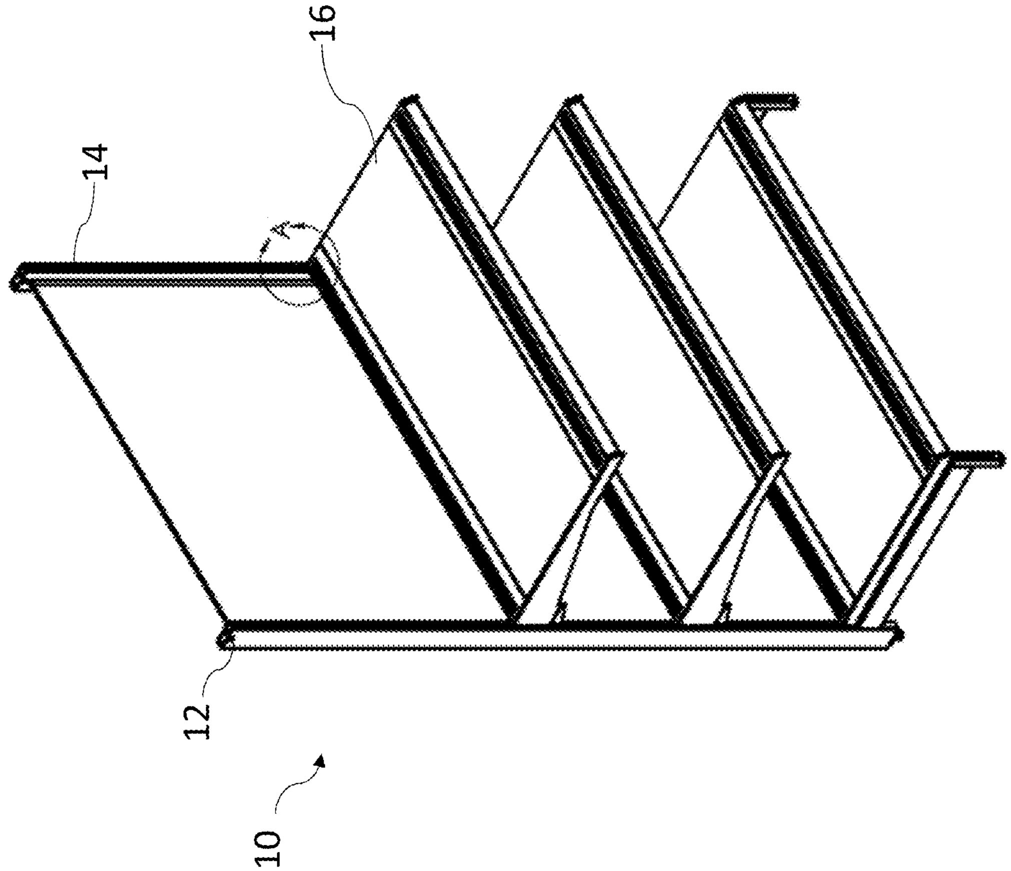
FIG. 7 illustrates a perspective front view of an embodiment of a shelving unit with which the shelf locking device can be used.
Figure 8:
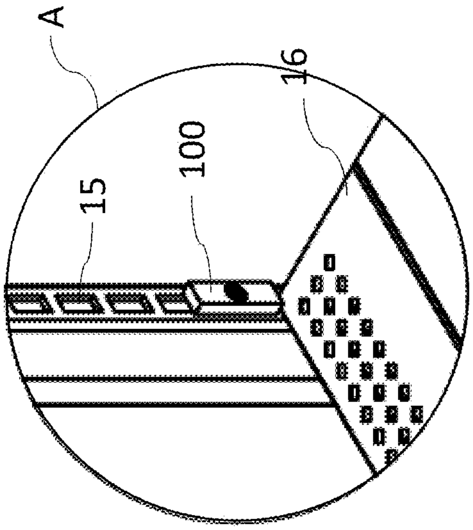
FIG. 8 illustrates a close-up view of area A of the embodiment of FIG. 7.
Figure 9:
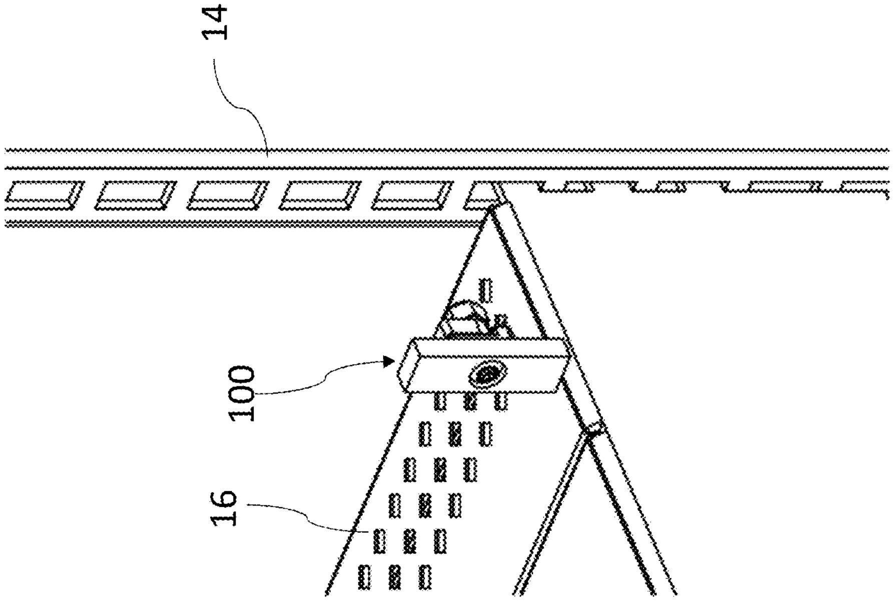
FIG. 9 illustrates a partial perspective view of a shelving unit with an embodiment of the shelf locking device in an uninstalled state.
Figure 10:
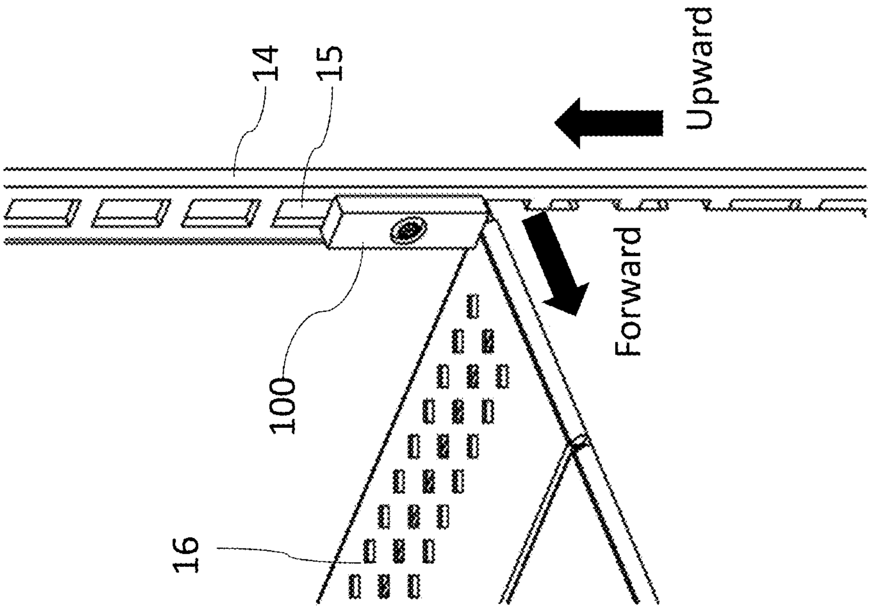
FIG. 10 illustrates the same view of FIG. 9 with the shelf locking device installed.

Another embodiment of the locking device 200 is shown in FIGS. 5 and 6. This embodiment of the locking device 200 is also structured to be installed directly above the shelf 16 to inhibit the shelf 16 from being lifted upward, which inhibits removal of the shelf 16 from the upright supports 12, 14. Referring to FIGS. 5 and 6, this embodiment of the locking device 200 includes several similar elements as the embodiment of the lock assembly 100 previously discussed. For example, the lock assembly 200 similarly includes a body 210 having a cradle 212 and defining an opening 214 that traverses the body 110 and the cradle 112 along an axis PA'. The body 210 extends between a first body end 211 and a second body end 213 and includes a first body protrusion 217 or first body lip at the first body end 211 and a second body protrusion 219 or second body lip at the second body end 213. As shown specifically in FIG. 4, the cradle 212 includes first and second extensions or protrusions 216, 218. The protrusions 216, 218 extend from the plane P' of the cradle 212 as indicated in FIG. 6. The body 210 and the cradle 212 may be formed as a single unitary component or may be formed as separate components, which are then coupled together using one or more fasteners and/or a welded joints.

The locking device 200 further includes a lock member 230 defining a lock member opening 234 that traverses the lock member 230. The lock member 230 has a first portion 232 extending along a first axis X1' and a second portion 236 extending along a second axis X2' that is parallel to the first axis X1' and laterally offset by a distance D' from the first axis X1' as shown in FIG. 6. The first portion 232 of the lock member 230 includes a first protrusion engagement surface 237 and the second portion 236 includes a second protrusion engagement surface 238 that faces away from the first protrusion engagement surface 237. Referring to the embodiment shown in FIG. 6, the first protrusion engagement surface 236 faces in an opposing direction relative to the second protrusion engagement surface 238.

Assembly and installation of the locking device will now be explained with reference to the embodiment of the locking device 100 shown in FIGS. 1-4 and 8-12, however it is noted that the locking device 200 shown in FIGS. 5 and 6 is assembled and installed in a similar manner. In order to assemble the locking device 100, the lock member 130 is positioned in the cradle 112 of the body 110 such that the opening 114 aligns with the lock member opening 134. The first protrusion engagement surface 137 of the first portion 132 engages the first protrusion 116, and the second protrusion engagement surface 138 of the second portion 136 engages the second protrusion 118 as shown in FIGS. 2 and 4. A pivot member 150, such as a fastener (a security screw or bolt) is inserted through the opening 114 and the lock member opening 134 and secured by a securing member 152. In this embodiment, the securing member 152 is positioned at the first or forward body surface 111. In an embodiment, the securing member 152 may be a nut. In another embodiment, a securing member 152 is not required and the pivot member 150 is anchored to or otherwise held in place relative to the body 110 and the lock member 130 due to an interaction or cooperation between complementary surface features on the pivot member 150 and around an inner surface of the opening 114, the lock member opening 134 and the adjustment opening 15.

Once the locking device 100 is assembled, it is then installed such that the lock member 130 is inserted into an adjustment opening 15 as shown in embodiments of FIGS. 8-11. The lock assembly 100 is installed at an adjustment opening 15 immediately above the shelf 16. Once inserted, the lock member 130 extends through the adjustment opening 15. As shown in FIG. 11, the lock member 130 is positioned such that the first protrusion engagement surface 137 of the first portion 132 is engaged with the first protrusion 116 and the second protrusion engagement surface 138 of the second portion 136 is engaged with the second extension 118. This is the unlocked position, which enables the locking device 100 to be freely removed from the adjustment opening 15.

In order to move the locking device 100 to the locked position as shown in FIG. 12, the lock member 130 is caused to pivot relative to the cradle 112 of the body 110 about the axis PA (which acts as a pivot axis) such that the second protrusion engagement surface 140 of the first portion 132 engages the second protrusion 118 and the first protrusion engagement surface 142 of the second portion 136 engages the first protrusion 116. The pivoting of the lock member 130 relative to the body 110 may occur as a result of a rotation of the pivot member 150 or the securing member 152. In other embodiments, the pivoting of the lock member 130 relative to the body 110 may only be accomplished after loosening or removal of the pivot member 150 and/or the securing member 152. When in the locked position, the locking device 100 may be inhibited from pivoting relative to the cradle 112 due to an interaction between the lock member 130 and the body 110. When the locking device is in the locked position as shown in FIG. 12, the position of the lock member 130 contacts a rear surface or an inner surface 17 of the upright support 12, 14, which inhibits removal of the locking device 100 from the adjustment opening 15. Positioning the locking device 100 in an adjustment opening 15 directly above the shelf 16 inhibits tilting of the shelf in the upward direction due to the body 110 extending in a forward direction from the upright support 12, 14. If the shelf 16 is unable to be tilted in the upward direction, then the shelf 16 is prevented from being removed from the upright supports 12, 14. Referring to the embodiment shown in FIGS. 5 and 6, the first and second body protrusions 217, 219 are structured to protrude further forward from the body 210 than in other embodiments of the locking device 100, which may better inhibit the upward tilting of the shelf 16. In some embodiments, at least one of the first and second body protrusions 217, 219 are structured to contact the shelf 16 to inhibit an upward movement of the shelf 16 relative to the upright supports 12, 14.

The invention is inclusive of combinations of the aspects described herein. References to an "embodiment" and the like refer to features that are present in at least one aspect of the invention. Separate references to "an embodiment" or "particular aspects" or the like do not necessarily refer to the same aspect or aspects; however, such aspects are not mutually exclusive, unless so indicated or as are readily apparent to one of skill in the art. The use of singular or plural in referring to elements of the disclosed barrier apparatuses is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A shelf locking device comprising:
a body extending from a first body end to an opposing second body end and comprising,
a forward facing surface, and
a rearward facing surface including a first protrusion extending from the rearward facing surface and a second protrusion extending from the rearward facing surface; and
a lock member pivotally coupled to the rearward facing surface of the body, the lock member comprising,
a first portion extending along a first axis, and
a second portion extending along a second axis that is parallel to the first axis and laterally offset by a distance,
wherein:
the first portion further including a first protrusion engagement surface and a second protrusion engagement surface,
the second portion includes a first protrusion engagement surface and a second protrusion engagement surface,
when in an unlocked position, the first protrusion engagement surface of the first portion of the lock member engages the first protrusion of the body and the second protrusion engagement surface of the second portion of the lock member engages the second protrusion of the body,
when in a locked position, the second protrusion engagement surface of the first portion of the lock member engages the second protrusion of the body and the first protrusion engagement surface of the second portion of the lock member engages the first protrusion of the body.

2. The shelf locking device of claim 1, wherein the first protrusion engagement surface of the first portion faces in a first direction and the second protrusion engagement surface of the second portion faces in a second direction that faces away from the first direction.

3. The shelf locking device of claim 1, further comprising a pivot member that traverses the body and the lock member.

4. The shelf locking device of claim 1, wherein the body further comprises at least one body lip that extends from the forward facing surface of the body.

5. The shelf locking device of claim 3, further including a securing member configured to couple to an end of the pivot member.

6. The shelf locking device of claim 1, wherein:
the first protrusion engagement surface of the first portion and the first protrusion engagement surface of the second portion each face in a first direction;
the second protrusion engagement surface of the first portion and the second protrusion engagement surface of the second portion face in a second direction; and
the first direction is opposite the second direction.

7. A shelf locking device comprising:
a body comprising,
a forward facing surface, and
a rearward facing surface including a first protrusion extending from the rearward facing surface and a second protrusion extending from the rearward facing surface; and
a lock member pivotally coupled to the rearward facing surface of the body, the lock member comprising,
a first portion, and
a second portion that extends away from the first portion,
wherein:
the first portion further including a first protrusion engagement surface and a second protrusion engagement surface,
the second portion includes a first protrusion engagement surface and a second protrusion engagement surface,
when in an unlocked position, the first protrusion engagement surface of the first portion of the lock member engages the first protrusion of the body and the second protrusion engagement surface of the second portion of the lock member engages the second protrusion of the body,
when in a locked position, the second protrusion engagement surface of the first portion of the lock member engages the second protrusion of the body and the first protrusion engagement surface of the second portion of the lock member engages the first protrusion of the body.

8. The shelf locking device of claim 7, wherein first portion extends along a first axis, and the second portion extends along a second axis that is parallel to the first axis and laterally offset by a distance.

9. The shelf locking device of claim 7, wherein the first protrusion engagement surface of the first portion faces in a first direction and the second protrusion engagement surface of the second portion faces in a second direction that faces away from the first direction.

10. The shelf locking device of claim 7, further comprising a pivot member that traverses the body and the lock member.

11. The shelf locking device of claim 7, wherein the body further comprises at least one body lip that extends from the forward facing surface of the body.

12. The shelf locking device of claim 11, further including a securing member configured to couple to an end of the pivot member.

13. The shelf locking device of claim 7, wherein:
the first protrusion engagement surface of the first portion and the first protrusion engagement surface of the second portion each face in a first direction;
the second protrusion engagement surface of the first portion and the second protrusion engagement surface of the second portion face in a second direction; and
the first direction is opposite the second direction.

14. A method of manufacturing a shelf locking device, comprising:
structuring a body to comprise,
a forward facing surface, and
a rearward facing surface;
structuring the rearward facing surface to include a first protrusion and a second protrusion that each extend from the rearward facing surface;
structuring a lock member to pivotally coupled to the rearward facing surface of the body and to comprise a first portion, and a second portion that extends away from the first portion;

structuring the first portion to include a first protrusion engagement surface and a second protrusion engagement surface;

structuring the second portion to include a first protrusion engagement surface and a second protrusion engagement surface;

structuring the shelf locking device to define an unlocked position where the first protrusion engagement surface of the first portion of the lock member engages the first protrusion of the body and the second protrusion engagement surface of the second portion of the lock member engages the second protrusion of the body; and structuring the shelf locking device to define a locked position where the second protrusion engagement surface of the first portion of the lock member engages the second protrusion of the body and the first protrusion engagement surface of the second portion of the lock member engages the first protrusion of the body.

15. The method of claim 14, further comprising, structuring the first protrusion engagement surface of the first portion to face in a first direction, and structuring the second protrusion engagement surface of the second portion to face in a second direction that faces away from the first direction.

16. The method of claim 14, further comprising structuring a pivot member to traverse the body and the lock member.

17. The method of claim 14, further comprising structuring the body to further comprise at least one body lip that extends from the forward facing surface of the body.

18. The method of claim 16, further comprising structuring a securing member to couple to an end of the pivot member.

19. The method of claim 14, further comprising:

structuring the first protrusion engagement surface of the first portion and the first protrusion engagement surface of the second portion each face in a first direction; and structuring the second protrusion engagement surface of the first portion and the second protrusion engagement surface of the second portion face in a second direction, and wherein the first direction is opposite the second direction.

* * * * *